United States Patent Office 3,182,808
Patented May 11, 1965

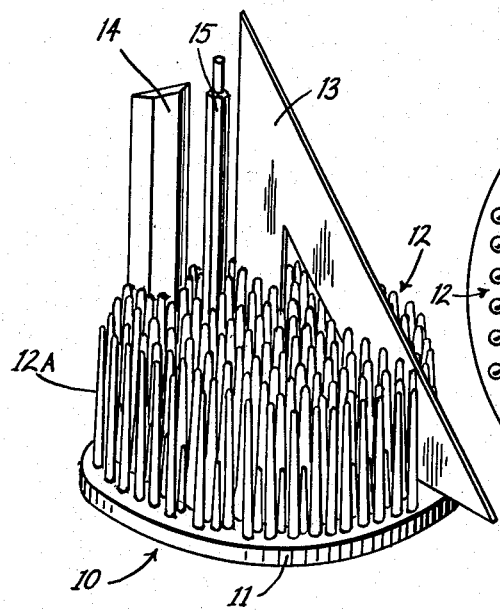
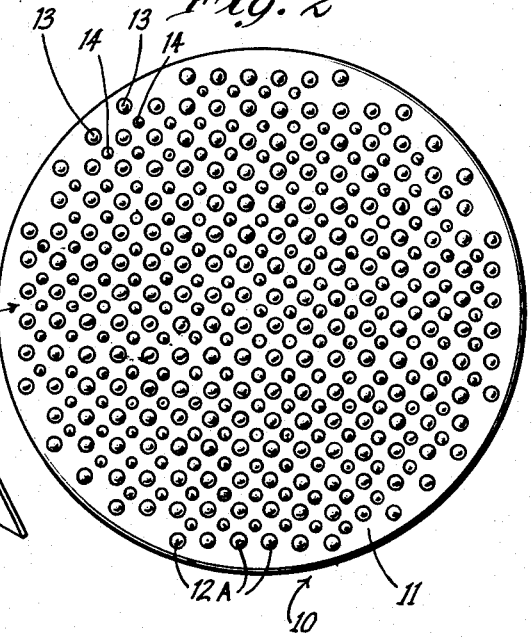
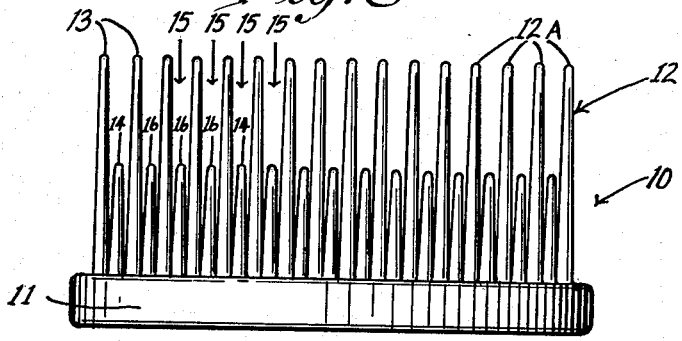
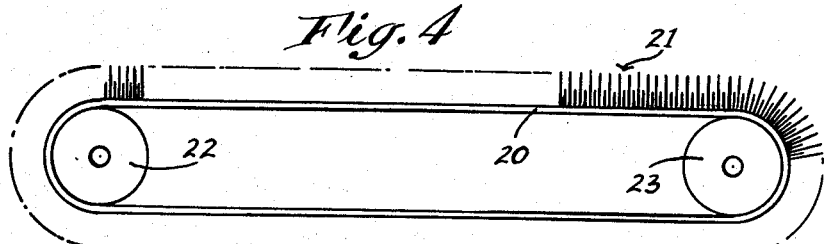

3,182,808
ARTICLE HOLDER
Roland A. Benoit, Dayville, Conn. (192—10B 64th Ave., Flushing, N.Y.); Robert F. Gingras, Proulx St., Danielson, Conn.; and Richard H. Duprey, Box 145, Central Village, Conn.
Filed Dec. 20, 1962, Ser. No. 246,080
6 Claims. (Cl. 211—69)

This invention relates in general to a holder for supporting various miscellaneous articles and more specifically to an object holder capable of randomly supporting articles of various sizes and shapes in orderly accessible positions.

Heretofore, difficulties have been encountered in many industries and occupations in maintaining articles and work pieces of different sizes and shapes in an orderly and readily accessible manner. For example, in manufacturing plants dealing with relatively small and oddly shaped components, such as electronic plants, it is often necessary to transport small delicate assemblies and component parts from one place to another. To accomplish this transport, specially designed tote boxes, trays or racks have been customarily employed. Generally, such tote boxes or racks are of relatively complex and expensive constructions. In addition, the articles so transported were not easily accessible, and unless extreme care was taken delicate components were subject to damage by contact with each other or vibration.

In other arts, as for example in drafting, similar difficulties have been encountered. As is well known, the drawing board of a draftsman usually carries numerous triangles, pencils, erasers and other required drawing aids. Scattered over the drawing board in the usual way such articles obstruct portions of the drawing, and considerable time may be lost by the draftsman in searching for the proper tool.

It is, therefore, an object of the present invention to provide an article holder capable of supporting articles of various sizes and shapes in an orderly and readily accessible manner.

Another object is to provide an article holder which is so constructed as to retain many articles, each separate and apart from the other and free from interference with one another.

Still a further object is to provide an article holder accomplishing the foregoing objectives which is nevertheless relatively simple and inexpensive to construct while being positive in operation.

A feature of the present invention resides in the fact that the article holder provided may be constructed as a single unitary piece manufactured from various types of suitable material.

Another feature of the present invention resides in the fact that articles may be frictionally and unmovably retained in the article holder while nevertheless being transportable with a minimum amount of effort and without exercising great care.

Other features and advantages of this invention will become readily apparent when considered in view of the following specification taken in conjunction with the drawings in which FIG. 1 is a perspective view of an article holder embodying the instant invention;

FIG. 2 is a plan view of the article holder;

FIG. 3 is an end view of the article holder;

FIG. 4 is a modified form of invention illustrating the concept thereof as applied to an endless conveyor.

Referring to the drawings, FIG. 1 illustrates an article holder embodying the present invention. The holder 10 comprises a base portion 11 which supports a plurality of closely spaced projecting fingers 12. The article holder 10 is readily adapted for manufacture as a single unitary article which can be made of any suitable plastic material. The projecting fingers 12 are so constructed as to be flexible and resilient to the extent necessary for supporting articles which are retained thereby, as for example the triangle 13, ruler 14 and pencil 15.

These articles are shown merely to facilitate the illustration of the concept of the present invention and are not to be considered as restrictive for the holder may be used for supporting various other articles such as components and assemblies utilized in the electronic, radio, watchmaking and other industries.

While the projecting fingers illustrated are formed of two different sizes, it will be understood that the fingers may be of a variety of sizes depending upon the particular application and use of the article holder.

As illustrated in FIGS. 1 to 3, the fingers 12A and 12B of each length are spaced in rows 13, 14, respectively. The rows 13 and 14 are parallel to one another and each extends across the surface of the base portion. Row 14 of the shorter fingers 12B are disposed between alternate adjacent rows 13 of the longer fingers 12A. The spacing of the shorter fingers 12B in row 14 is staggered with respect to the spacing of the longer fingers 12A in the row 13 adjacent thereto. The arrangement is such that the long and short fingers 12A, 12B in rows 13 and 14 run north and south, and east and west as viewed in FIG. 2. However, in rows parallel to the diagonal extending across the base 11, as viewed in FIG. 2, the long and short fingers 12A, 12B are alternately spaced in a given row.

The respective fingers 12A, 12B are each conically shaped. That is, each finger tapers upwardly and inwardly from its lower end which is integrally connected to the base 11 of the holder. The diameter at the base of the longer fingers 12A is larger than the base diameter of the shorter fingers 12B, and the diameters of the shorter fingers 12B are substantially equal to the distance between the adjacent fingers 12A at the base thereof. It will be therefore noted that the aisles 15 defined between adjacent rows of long fingers 12A, and the aisles 16 between rows of long and short fingers, as seen in FIG. 3 for receiving the various articles taper downwardly and inwardly, and thereby are able to accommodate articles of various sizes and shapes, e.g. a paper thin article or a relatively large bulky item, as for example, an electronic tube, resistor, watch cases and sundry other articles of various shapes. Also, it is to be noted that the articles inserted in the aisles 15, 16 formed between the adjacent fingers are further protected from one another by the resilient fingers which retain it. Thus the articles are prevented from knocking against one another when in transportation, as for example, when the instant invention is employed in a conveyor belt or the like as shown in FIG. 4, or when the holder 10 of the instant invention is employed as separators in boxes for transporting various articles.

As shown in FIG. 4 the invention embodied in FIGS. 1 to 3 is equally applicable for use in a conveyor system. In the embodiment of FIG. 4, the conveyor is illustrated as an endless belt 20. Accordingly, a plurality of fingers 21 are connected to the upper surface of the belt. The arrangement in the spacing and shape of the fingers 21 on the belt 20 is similar, as hereinbefore described.

The material of the belt 20 is sufficiently flexible so that it may be placed over spaced rollers 22, 23 and operated in a manner of a conventional endless belt. Workpieces to be carried and transported by the belt 20 can be randomly interposed between the respective finger 21 connected to the surface of the belt and moved from one work station to another work station. The work pieces are thus frictionally retained between the fingers projecting from the surface of the belt. Also, the fingers retaining the workpieces serve to prevent the work pieces from interfering with one another, while at the same time render them readily accessible to the operator whose task is to assemble the components carried on the belt 20 as they are received by him.

From the foregoing description it will be apparent that the article holder described is relatively simple to use, inexpensive to manufacture, and positive in operation. It supplies a need which was heretofore not known to exist in the various industries and occupation.

While the instant invention has been disclosed with reference to several embodiments thereof, it is to be appreciated that the invention is not to be taken as limited to all the details thereof as modifications and variations thereof may be made without departing from the spirit or scope of the invention.

We claim:

1. A holder for maintaining objects of various shapes and sizes in an orderly and accessible manner comprising a single unitary molded article having a base portion and a cluster of elongated flexible fingers projecting upwardly from said base portions; said fingers being aligned in rows in which certain of said fingers are longer than others and wherein the shorter fingers are spaced between adjacent pairs of longer fingers, and said fingers being closely spaced to one another so that an object inserted between said fingers is frictionally retained by the fingers adjacent thereto whereby depending on the size and shape of the object, the latter may be frictionally retained between the extended ends of adjacent pairs of the long fingers or between adjacent long and short fingers.

2. A holder for maintaining objects of various shapes and sizes in an orderly and accessible manner comprising a single unitary molded article having a base portion and a cluster of flexible fingers projecting upwardly from said base portion; said fingers being aligned in rows, each row including long and short fingers, wherein the shorter fingers are spaced and staggered between pairs of longer fingers adjacent thereto, and said fingers being closely spaced with respect to one another so that an object inserted between said fingers is frictionally retained by the fingers adjacent thereto wherein each of said fingers taper upwardly and inwardly from the lower end thereof connected to said base portion.

3. A conveyor for maintaining objects of various shapes and sizes in an orderly and accessible manner comprising an endless belt having a base portion and a plurality of closely spaced flexible fingers projecting upwardly from said base portion; certain of said fingers being longer than others wherein the shorter fingers are spaced between pairs of adjacent longer fingers, said fingers being conically shaped, and said fingers being spaced to one another so that an object inserted between said fingers is frictionally retained by the fingers adjacent thereto whereby depending on the size and shape of the object, the latter may be frictionally retained between the extended ends of adjacent pairs of the long fingers or between a long and short finger.

4. A holder for maintaining objects of various shapes and sizes in an orderly and accessible manner comprising a single unitary molded article including a base portion, a plurality of flexible fingers projecting upwardly from said base portion, said fingers being spaced in parallel rows extending across the surface of said base portion, the fingers spaced in alternate rows being longer than those spaced in the rows between said alternate rows, and the fingers in said alternate rows being staggered with respect to the fingers spaced in the rows between said alternate rows, said longer fingers having greater cross-sectional area at the lower end thereof than the fingers disposed in said rows between said alternate rows whereby the diameter of the longer fingers are substantially equal to the spacing between adjacent fingers in the rows between said alternate rows so that an article positioned between said fingers is wedged and frictionally retained between the surrounding fingers.

5. A holder for maintaining objects of various shapes and sizes in an orderly and accessible manner comprising a single unitary molded article including a base portion, and a plurality of flexible fingers projecting upwardly from said base portion, each of said fingers being of conical configuration tapering upwardly and inwardly from its lower end which is integrally connected to the surface of said base portion, said fingers being spaced in parallel rows extending across the surface of said base portion, the fingers spaced in alternate rows being longer than those spaced in the rows between said alternates rows, the fingers in said alternate rows being staggered with respect to the fingers spaced in the rows between said alternate rows, and said longer fingers having greater cross-sectional area at the lower end thereof than the fingers disposed in rows between said alternate rows whereby the diameter of the shorter fingers is substantially equal to the spacing between adjacent fingers of said alternate rows so that an article positioned between said fingers is wedged and frictionally retained between the fingers adjacent thereto.

6. A conveyor for maintaining objects of various shapes and sizes in an orderly and accessible manner comprising a unitary endless belt including a base, and a plurality of flexible fingers projecting upwardly from said base, each of said fingers being of conical configuration tapering upwardly and inwardly from its lower end which is integrally connected to the surface of said base, said fingers being spaced in parallel rows extending across the surface of said base portion, the fingers spaced in alternate rows being longer than those spaced in the rows between said alternate rows, and the fingers in said alternate rows being staggered with respect to the fingers spaced in the rows between said alternate rows, and said longer fingers having greater cross-sectional area at their lower ends than the fingers disposed in the rows between said alternate rows whereby the diameter of the longer fingers at the connected end thereof are substantially equal the spacing between adjacent fingers in the row between said alternate rows so that an article positioned between said fingers is wedged and frictionally retained between the adjacent fingers.

References Cited in the file of this patent

UNITED STATES PATENTS

| 874,982 | Norton | Dec. 31, 1907 |
| 1,762,473 | Hancock | June 10, 1930 |
| 1,812,287 | Davis | June 30, 1931 |
| 1,953,204 | Victor | Apr. 3, 1934 |
| 2,621,807 | Rendich | Dec. 16, 1952 |
| 2,636,615 | Bradley | Apr. 28, 1953 |
| 2,645,354 | Bradley | July 14, 1953 |
| 2,925,165 | Rake | Feb. 16, 1960 |

CLAUDE A. LE ROY, *Primary Examiner.*

FRANK L. ABBOTT, *Examiner.*